US009976735B2

(12) United States Patent
Honda et al.

(10) Patent No.: US 9,976,735 B2
(45) Date of Patent: May 22, 2018

(54) LINEAR LED LUMINAIRE FOR USE IN HARSH AND HAZARDOUS LOCATIONS

(71) Applicant: Cooper Technologies Company, Houston, TX (US)

(72) Inventors: Budd Shaw Honda, Baldwinsville, NY (US); Adam Douglas Ledgerwood, Syracuse, NY (US); Daniel Robert Treible, Jr., Clay, NY (US); Virginia Marie Merriam, Clay, NY (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 26 days.

(21) Appl. No.: 15/172,225

(22) Filed: Jun. 3, 2016

(65) Prior Publication Data
US 2016/0356475 A1 Dec. 8, 2016

Related U.S. Application Data

(60) Provisional application No. 62/170,886, filed on Jun. 4, 2015.

(51) Int. Cl.
F21V 19/04 (2006.01)
F21V 25/12 (2006.01)
(Continued)

(52) U.S. Cl.
CPC ............ F21V 25/12 (2013.01); F21K 9/27 (2016.08); F21S 8/033 (2013.01); F21S 8/04 (2013.01);
(Continued)

(58) Field of Classification Search
CPC ...... F21S 9/02; F21S 8/033; F21S 8/04; F21S 4/28; F21K 9/27; F21K 9/275;
(Continued)

(56) References Cited

U.S. PATENT DOCUMENTS

2007/0274084 A1 11/2007 Kan et al.
2009/0272986 A1* 11/2009 Chan ................. F21V 15/01
257/88
(Continued)

FOREIGN PATENT DOCUMENTS

WO 2014/086497 A1 6/2014

OTHER PUBLICATIONS

International Search Report and Written Opinion for Corresponding Application No. PCT/US2016/035635; dated Sep. 2, 2016.

Primary Examiner — Alexander Garlen
(74) Attorney, Agent, or Firm — Pearne & Gordon LLP

(57) ABSTRACT

A linear light fixture is provided which includes a housing body onto which a bezel is attached. Semiconductor LEDs or other light emitting source that produce light when electrically powered are located behind a lens that is secured to the housing body by the bezel. One or more incandescent light bulbs that include an electric filament that produce light when electrified as well as one or more fluorescent bulbs that produce light based at least in part on the electrification and illumination of a plasma or gas can also be used as a source of illumination. For example, the linear light fixture can further include a driver housing that includes a driver housing cover to permit access to at least one driver and/or battery backup components located within the driver housing. There is also at least one window in the bezel which permits illumination of an area or object.

18 Claims, 18 Drawing Sheets

(51) Int. Cl.
*F21V 31/00* (2006.01)
*F21S 9/02* (2006.01)
*F21S 8/04* (2006.01)
*F21S 8/00* (2006.01)
*F21V 23/00* (2015.01)
*F21V 5/04* (2006.01)
*F21V 15/01* (2006.01)
*F21K 9/27* (2016.01)

(52) U.S. Cl.
CPC .... *F21S 9/02* (2013.01); *F21V 5/04* (2013.01); *F21V 15/01* (2013.01); *F21V 23/001* (2013.01); *F21V 31/005* (2013.01)

(58) Field of Classification Search
CPC ......... F21K 9/278; F21V 25/12; F21V 15/01; F21V 31/005; F21V 5/04; F21V 23/001
See application file for complete search history.

(56) References Cited

U.S. PATENT DOCUMENTS

| | | | |
|---|---|---|---|
| 2010/0319953 A1 | 12/2010 | Yochum et al. | |
| 2011/0089390 A1* | 4/2011 | Steinkraus | E04F 11/181 256/65.02 |
| 2011/0188233 A1* | 8/2011 | Josefowicz | F21S 8/086 362/158 |
| 2011/0285314 A1* | 11/2011 | Carney | E04B 9/006 315/294 |
| 2012/0250302 A1* | 10/2012 | Edwards | F21V 31/005 362/223 |
| 2013/0021792 A1 | 1/2013 | Snell et al. | |
| 2013/0094225 A1* | 4/2013 | Leichner | F21S 2/005 362/368 |
| 2013/0249404 A1 | 9/2013 | Eckel et al. | |
| 2014/0313780 A1* | 10/2014 | Myers | F21V 23/06 362/646 |
| 2015/0036387 A1* | 2/2015 | Myers | F21V 23/06 362/646 |
| 2015/0308673 A1* | 10/2015 | Burmeister | F21V 25/12 362/249.02 |

* cited by examiner

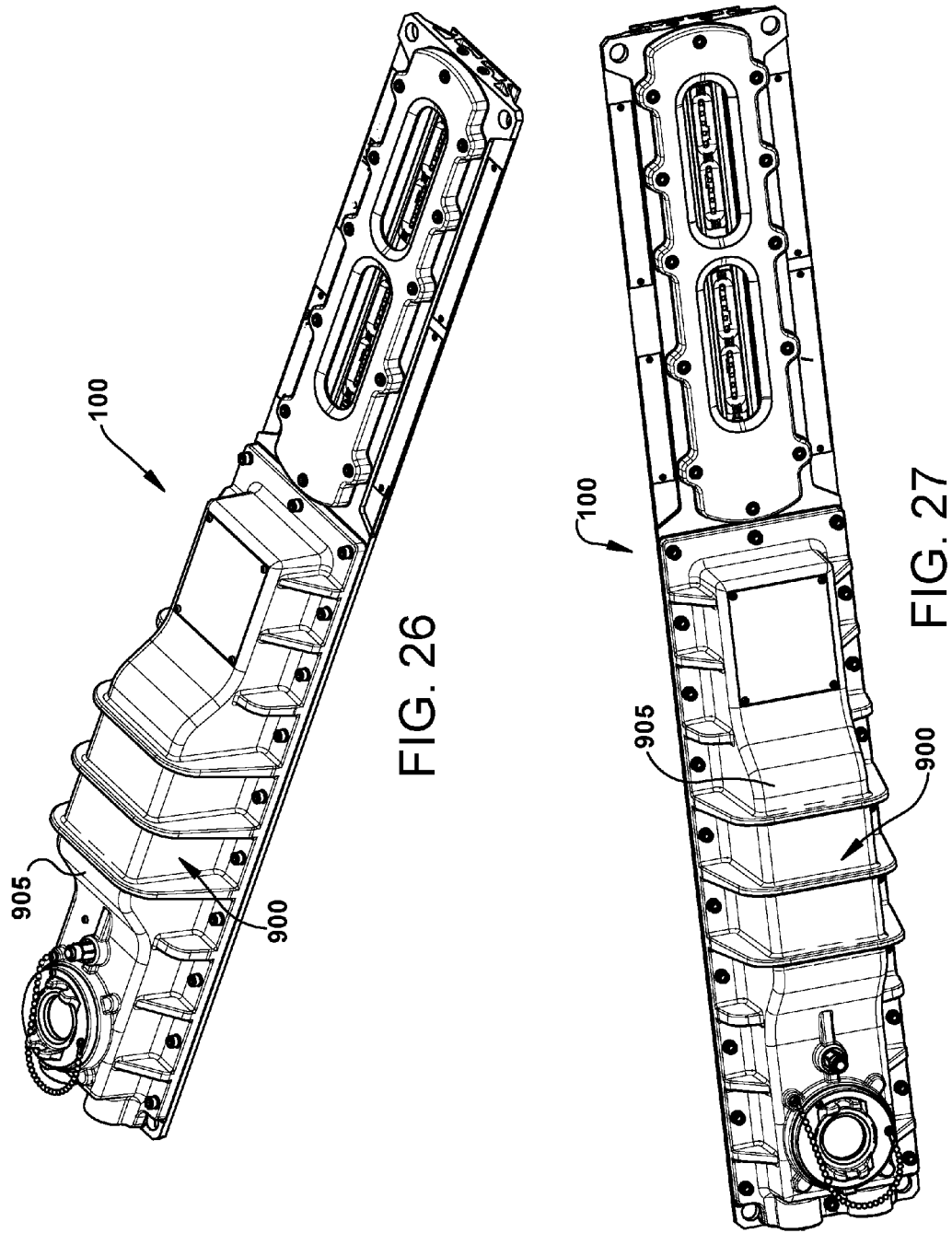

LINEAR LED LUMINAIRE FOR USE IN HARSH AND HAZARDOUS LOCATIONS

FIELD

The subject application relates to linear light fixtures (e.g. luminaires). More particularly, a low profile linear light fixture, which may include light emitting diodes (LEDs), and that can be used in harsh and hazardous locations is provided.

BACKGROUND

Linear light fixtures (e.g. fluorescent tube light fixtures) can be used in a variety of applications to provide various forms of lighting. For example, linear light fixtures may be employed in different locations to provide general lighting for visibility. In some instances, a linear light fixture may be mounted to a ceiling to illuminate an interior area of a building or other enclosure. Other environments requiring linear lighting include those that are outdoors such as in partial enclosures or areas which are fully exposed to weather or various artificial conditions produced by related machinery or equipment.

BRIEF DESCRIPTION OF THE DRAWINGS

FIG. 26 is an illustration of a linear light fixture in accordance with embodiments described herein, including an example battery backup unit attached thereto;

FIG. 27 is an illustration of a linear light fixture in accordance with embodiments described herein, including an example battery backup unit attached thereto;

DETAILED DESCRIPTION

The following presents a description of the disclosure; however, aspects may be embodied in many different forms and should not be construed as limited to the embodiments set forth herein. Furthermore, the following examples may be provided alone or in combination with one or any combination of the examples discussed herein.

Figure 1:
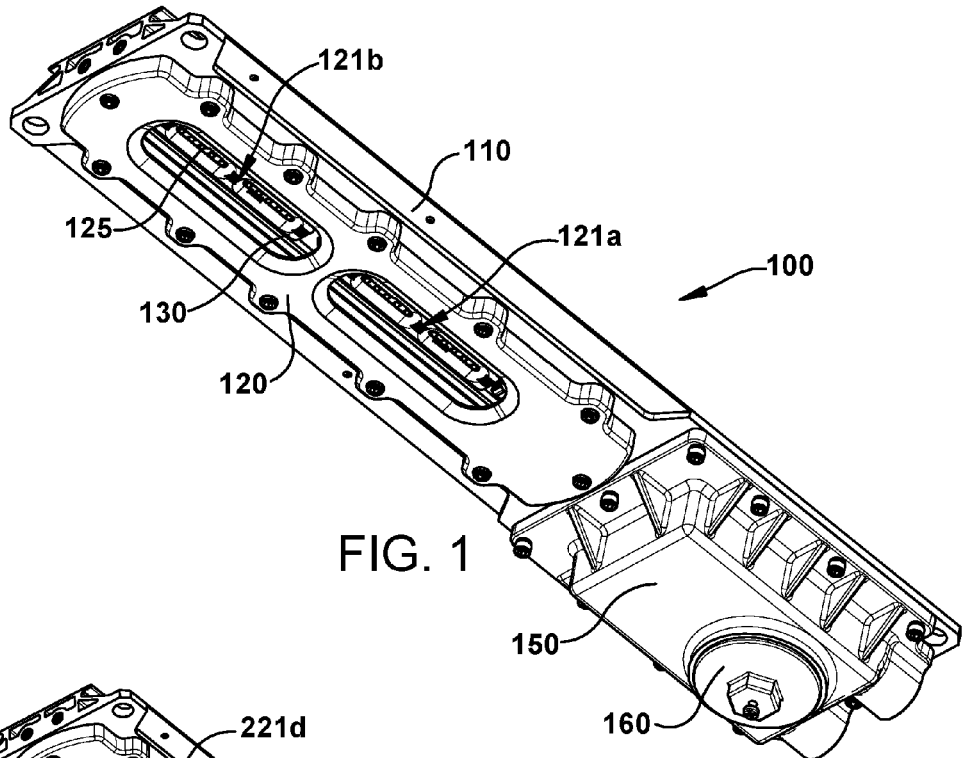
FIG. 1 is an illustration of an example linear light fixture in accordance with embodiments described herein.

As shown in FIG. 1, a first example linear light fixture 100 includes a housing body 110 onto which a bezel 120 is attached. Semiconductor light emitting diodes (LEDs) 125 that produce light when electrically powered are located behind a lens 130 that is secured to the housing body 110 by the bezel 120. It is to be understood that, although LEDs are described herein as a light producing or light emitting source, other light producing or light emitting sources, including those not explicitly described herein, could also be used and are considered to be within the scope of the disclosure. For example, other solid state electroluminescence lighting sources, such as organic light emitting diodes (OLEDs) or polymer light emitting diodes (PLEDs) can also be used as a source of illumination and are considered to be within the scope of the disclosure. In addition, one or more incandescent light bulbs that include an electric filament that produces light when electrified as well as one or more fluorescent bulbs that produces light based at least in part on the electrification and illumination of a plasma or gas can also be used as a source of illumination and are considered to be within the scope of the disclosure.

The first example linear light fixture 100 can further include a driver housing 150 that includes a driver housing cover 160 to permit access to at least one power converter (e.g., driver 155) (shown in FIG. 6 and FIG. 11) and/or battery power storage device (e.g., backup components) located within the driver housing 150. The first example linear light fixture 100 includes two windows 121a, 121b in the bezel through which light from the LEDs 125 can shine to illuminate an area or object. In other examples, a linear light fixture may include a single window or multiple windows. The single window or multiple windows can be formed in one or more bezels that attach to one or more housing bodies.

Figure 2:
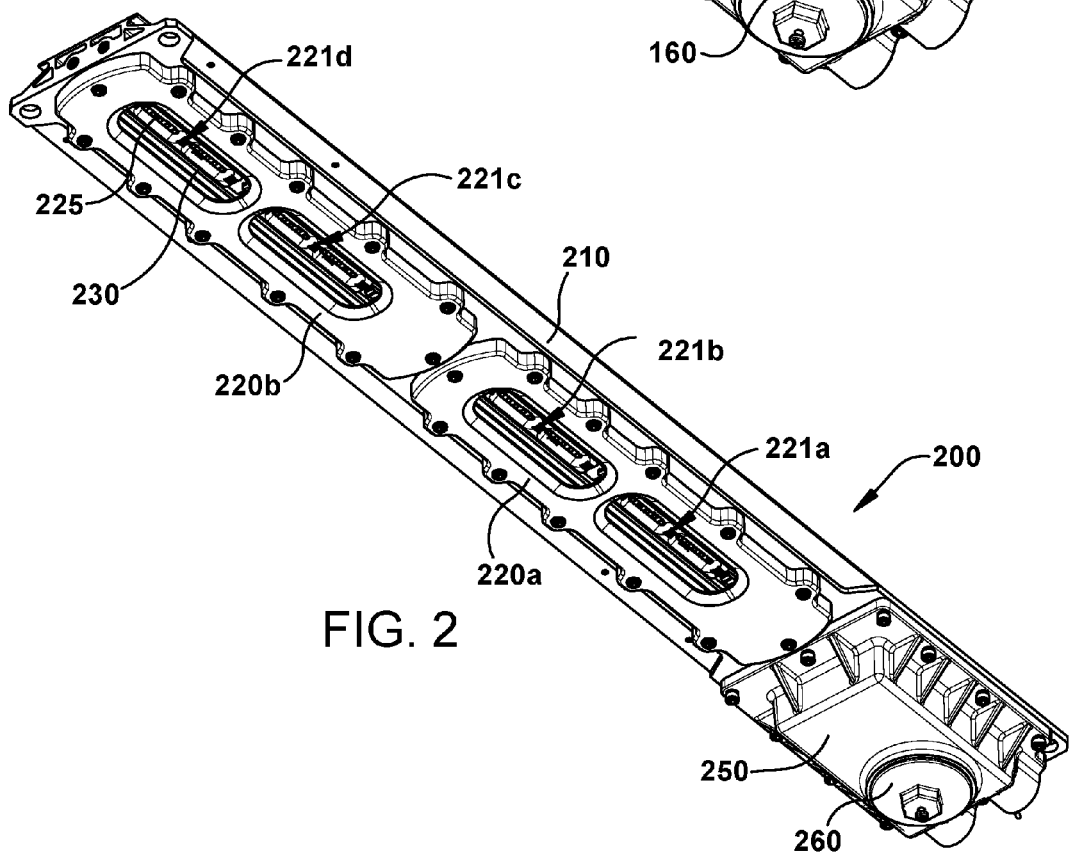
FIG. 2 is an illustration of another example linear light fixture in accordance with embodiments described herein.

As shown in FIG. 2, a second example linear light fixture 200 includes a larger housing body 210 onto which a first bezel 220a and a second bezel 220b are attached. Light emitting diodes (LEDs) 225 that produce light when electrically powered are located behind a lens 230 that is secured to the housing body 210 by at least one of the first bezel 220a and the second bezel 220b. The second example linear light fixture 200 can further include a driver housing 250 that includes a driver housing cover 260 to permit access to a at least one driver 255 (shown in FIGS. 12-14) and/or battery backup components located within the driver housing 250. The second example linear light fixture 200 includes four windows 221a, 221b, 221c, and 221d in the first and second bezels 220a and 220b through which light from the LEDs 225 can shine to illuminate an area or object. It is to be understood that the first example linear light fixture 100 can include one or more of the same or similar components as well as one or more different components than the second example linear light fixture 200. Moreover, the first and second example linear light fixtures 100, 200 can include one or more additional components including those components not explicitly described herein, without departing from the scope of the disclosure.

Figure 3:
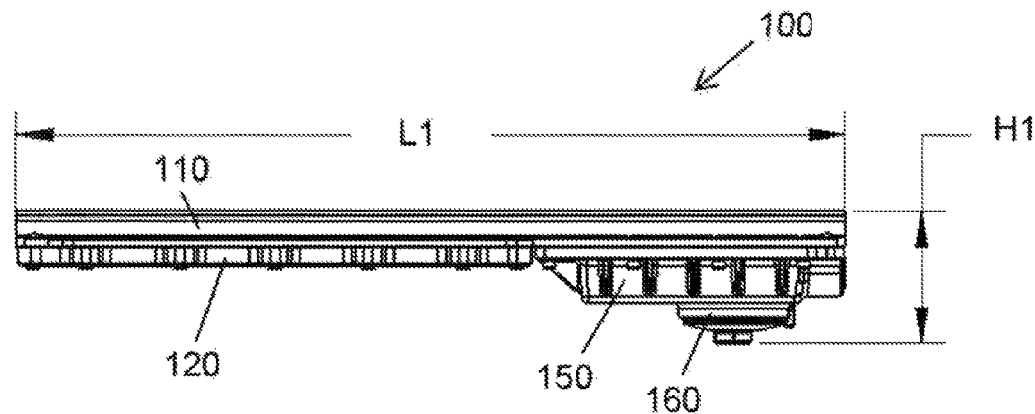
FIG. 3 is an illustration of a side view of the linear light fixture shown in FIG. 1.
Figure 4:
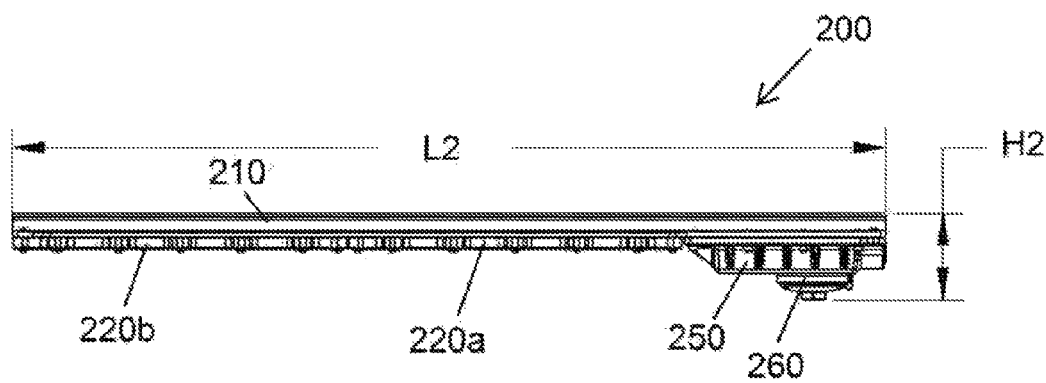
FIG. 4 is an illustration of a side view of the linear light fixture shown in FIG. 2.
Figure 5:
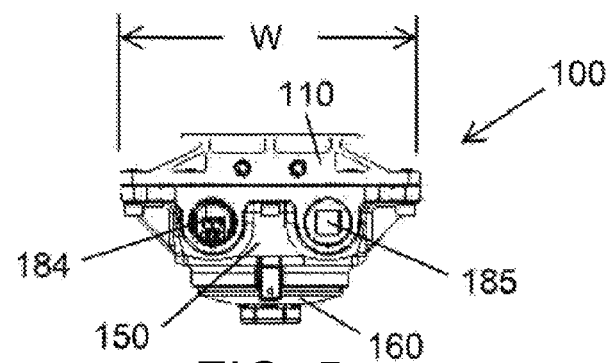
FIG. 5 is an illustration of an end view of the linear light fixtures shown in FIG. 1 and FIG. 2.

A side view of the first example linear light fixture 100 is shown in FIG. 3. The first example linear light fixture 100 has a length "L1" and a height "H1"—both greater than 0 units of measurement, but not equal to each other. In some examples, the first example linear light fixture can be low profile and have a height H1 that is approximately less than 5 inches (e.g., 4 inches) and a length L1 that is approximately 20-27 inches (e.g. a two-foot version). A side view of the second example linear light fixture 200 is shown in FIG. 4. The second example linear light fixture 200 has a length "L2" and a height "H2"—both greater than 0 units of measurement, but not equal to each other. In some examples, the second example linear light fixture can be low profile and have a height H2 that is approximately 4 inches and a length L2 that is approximately 44.5 inches (e.g. a four foot version). FIG. 5 shows an end view of the first example linear light fixture 100 having a width "W" that is approximately 6.5 inches. It is to be understood that the specific dimensions provided herein are example dimensions. Thus, the first example linear light fixture 100 and the second example linear light fixture 200 can have different dimensions, such as other lengths, heights, and widths, including dimensions not explicitly provided herein. In addition, the dimensions of the linear light fixture may be chosen based at least in part on space requirements or limitations of a particular location where the linear light fixture is to be installed and/or used.

As demonstrated in FIG. 3, the housing body 110 extends the length L1 of the first example linear light fixture 100. Further, the bezel 120 and the driver housing 150, including the driver housing cover 160, are attached to the housing body 110. As shown, the driver housing 150 is arranged linearly adjacent to the bezel 120 such that the first example linear light fixture 100 has a low profile corresponding to the height H1. Similarly, in FIG. 4, the longer housing body 210 extends the length L2 of the second example linear light fixture 200. Further, the first bezel 220a, the second bezel 220b, and the driver housing 250, including the driver housing cover 260, are attached to the longer housing body 210. The driver housing 250 is arranged linearly adjacent to the first bezel 220a and the second bezel 220b such that the second example linear light fixture 200 has a low profile corresponding to the height H2. Thus, as compared to a light fixture where, for example, the driver is mounted vertically above the light source, the linear light fixtures of the present application with the light source and the driver and/or battery backup components arranged linearly adjacent to each other are comparatively smaller in height and are, therefore, low profile.

In addition, as shown in FIG. 5, because the driver housing 150, including the driver housing cover 160, is attached to the housing body 110 at a location that is linearly adjacent to the bezel and the light source, the first example linear light fixture 100 has a compact width corresponding to the width W. Power connection ports 184 can be included on the driver housing 150 to provide access for electrical cables or wires into the driver housing 150 to supply electrical power to the driver 155. The power connection ports 184 can also provide access for electrical cables or wires out of the driver housing 150 to supply electrical power to, for example, another nearby linear light fixture such as a loop in/loop out wiring configuration. The linear light fixtures 100, 200 may also provide for through-feed wiring. For example, power wiring may be passed through ports 184 through the entirety of the fixtures 100, 200, and received by a nearby fixture from an opposite end. It is understood that such through-feed wiring is not intended to be limited to power wiring, or port 184. In this manner, the integrally extruded conduit 170 can carry wires from an external power source as well as from an internal power source. A plug 185 can be threaded into the power connection port 184 to seal the port in instances, for example, where electrical access through one or more of the power connection ports 184 is not needed.

Figure 6:
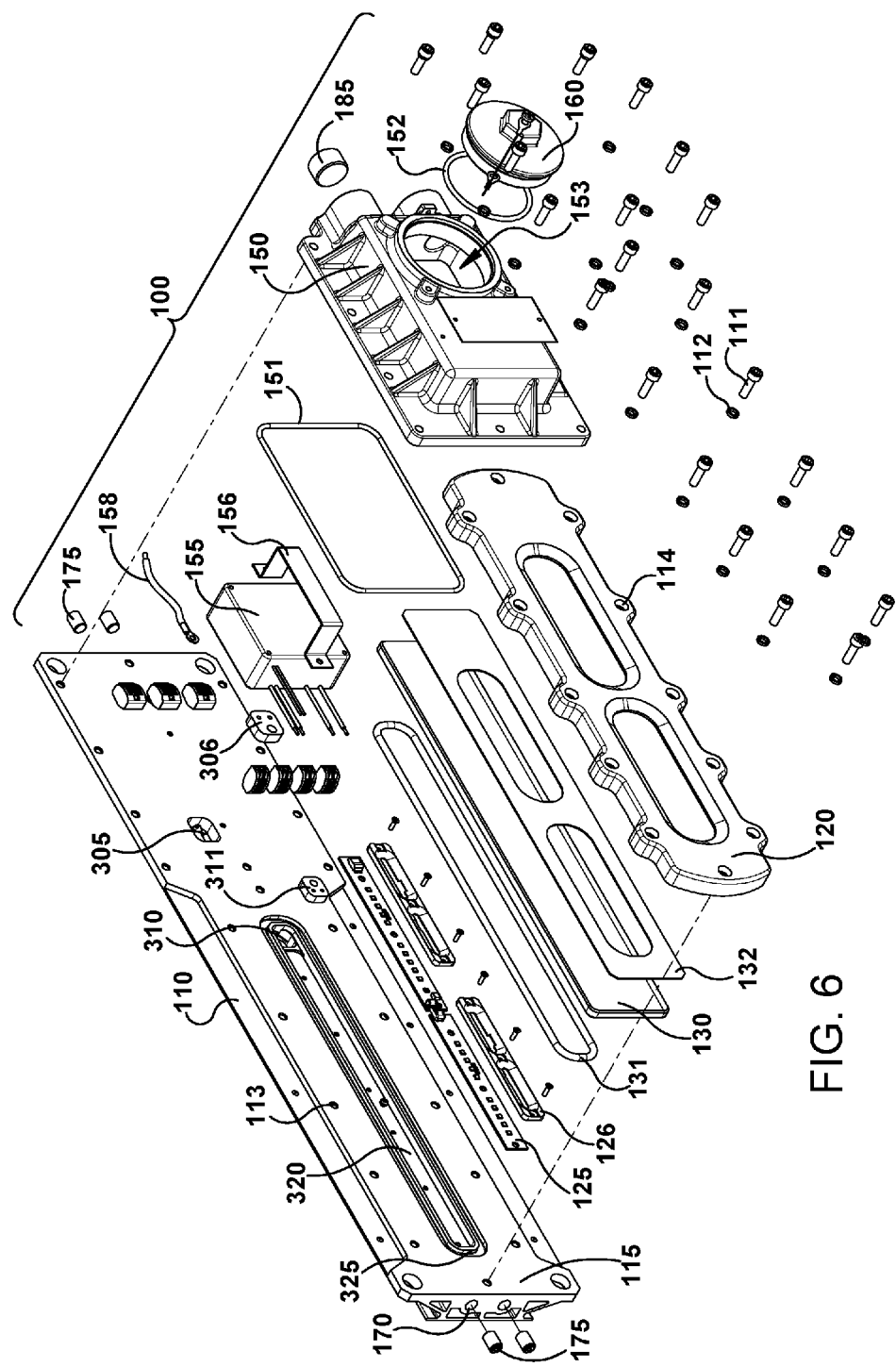
FIG. 6 is an illustration of an exploded perspective view of the linear light fixture shown in FIG. 1.

Turning to FIG. 6, an exploded perspective view of the first example linear light fixture 100 is provided. As shown, the linear light fixture 100 includes the housing body 110 to which the bezel 120 is configured to attach. The housing body 110 can include a plurality of threaded bores 113 into which a plurality of fasteners 111 (e.g. bolts or screws) can be threaded to secure the bezel 120 to the housing body 110. The bezel can also include a plurality of threaded or non-threaded apertures 114 through which the plurality of fasteners 111 extend to secure the bezel 120 to the housing body. A plurality of corresponding locking or non-locking washers 112 can be placed between the bezel 120 and each of the plurality of fasteners 111 at each of the plurality of threaded or non-threaded apertures 114 to provide a surface against which each of the plurality of fasteners 111 can contact when the bezel 120 is secured to the housing body 110.

In addition, the housing body 110 can include a lighting compartment 320 into which the LEDs 125 can be arranged. The lighting compartment 320 can be, for example, machined into a front surface 115 of the housing body 110 and can correspond at least in part to a size or shape of the LEDs 125 such that the LEDs 125 can be placed into the lighting compartment 320. In some examples, the lighting compartment 320 can be machined to have a depth from the front surface 115 of the housing body 110 such that when the LEDs 125 are placed into the lighting compartment 320, the LEDs are at or below a plane coplanar with the front surface 115 of the housing body 110. In other examples, the lighting compartment 320 can be machined to have a depth from the front surface 115 of the housing body 110 such that when the LEDs 125 are placed into the lighting compartment 320, the LEDs are above a plane coplanar with the front surface 115 of the housing body 110. Each light emitting diode can be wired (e.g. as a string of light emitting diodes) onto one or more printed circuit boards (PCB) to form the LEDs 125.

Still referring to FIG. 6, a reflector 126 can be mounted in proximity to the LEDs 125 to project, deflect, reflect, or otherwise distribute light produced by the LEDs 125 in one or more of a given direction or at one or more of a predetermined angle. The reflector 126 can be secured to the housing body 110 within the lighting compartment 320 by bolts, screws, clips, or any other fastener. Similar to the placement of the LEDs 125 within the lighting compartment 320, the reflector 126 can also be arranged at or below a plane coplanar with the front surface 115 of the housing body 110 or above a plane coplanar with the front surface 115 of the housing body 110. A gasket groove 325 can be machined around a periphery of the lighting compartment 320. The gasket groove 325 can be configured to receive a seal gasket 131 that is made of a material, such as rubber, that is flexible and that permits compressibility. The lens 130 can be pressed against the gasket 131, a lens protector 132 can be placed between the lens 130 and the bezel 120, and the bezel 120 can then be secured to the housing body 110 with the plurality of fasteners 111. The bezel 120 in combination with the lens 130 and the gasket 131 can thus provide a water-tight as well as a dust-tight enclosure around the LEDs 125 to protect the LEDs 125 and any associated wiring or electrical components from particulates, moisture, and any other unwanted debris or contaminants.

Similarly, the driver housing 150 can include a seal or gasket 151 configured to correspond to a shape of the outer periphery of the driver housing 150 to provide a water-tight as well as a dust-tight enclosure around the driver 155 and/or battery backup components to protect the driver 155 and/or battery backup components and any associated wiring or electrical components from particulates, moisture, and any other unwanted debris or contaminants. The gasket 151 can be arranged directly on the front surface 115 of the housing body 110 or can be arranged within a groove machined into the front surface 115 of the housing body 110 or a groove machined into an adjoining surface of the driver housing 150.

The driver housing 150 is secured to the housing body 110 with the plurality of fasteners 111. In addition, the driver 155 is an electronics module that is configured to convert alternating current (A/C) to direct current (D/C) or direct current (D/C) to direct current (D/C) and that is used to power the LEDs 125. The driver 155 and/or battery backup components can be secured to the housing body 110 with a bracket 156 and one or more fasteners. The driver housing cover 160 can attach to the driver housing 150 via a threaded connection provided at an access port 153 in the driver housing 150. In addition, the driver housing cover 160 can include a seal or gasket 152 configured to correspond to a shape of the driver housing cover 160 to provide a water-tight as well as a dust-tight seal around the access port 153 to protect the driver 155 and/or battery backup components and any associated wiring or electrical components from particulates, moisture, and any other unwanted debris or contaminants.

The driver housing cover 160 is removable from the driver housing 150 such that a user can access the fixture wiring interface to connect wires to the driver via the access port 153 without having to remove the plurality of fasteners 111 that secure the driver housing 150 to the housing body 110. For example, the access port 153 can provide access from a front of the linear light fixture 100 when a back of the light fixture is mounted to a surface, such as a wall or a ceiling. The access port 153 can also provide a user access to the driver 155 and/or battery backup components and any associated wiring or electrical components during initial installation of the light fixture (e.g. to connect a main power line to the light fixture), during routine inspections of the light fixtures, as well as during any other service or maintenance operations. To access the driver and/or battery backup components and any associated wiring or electronic components directly, the driver housing 150 and the plurality of fasteners 111 can be removed.

Accordingly, by arranging the LEDs 125 at one end of the linear lighting fixture 100 and the driver 155 and/or battery backup components at another end of the linear lighting fixture 100, the LEDs 125 and any associated wiring or electrical components are housed separately from the driver 155 and/or battery backup components and any associated wiring or electrical components. The linear light fixture 100 is therefore configured to be explosion proof and able to withstand internal pressures (e.g. pressures originating from the LEDs 125 and any associated wiring or electrical components or the driver 155 and/or battery backup components and any associated wiring or electrical components) or external pressures (e.g. pressures originating from the environment in which the linear light fixture 100 is employed). The linear light fixture 100 can therefore be used in hazardous or harsh locations and is configured to comply with the requirements of, for example, Class 1, Div. 1, NEC (e.g. explosive gas) and Class 2, Div. 1, NEC (e.g. explosive dust).

In some examples, the driver 155 and/or battery backup components and the driver housing 150, including the driver housing cover 160, can be configured to contain or withstand exposure to pressures (e.g. hydrostatic pressures) of approximately 600 psia and the lens can be configured to contain or withstand exposure to pressures (e.g. hydrostatic pressures) of approximately 300 psia. In other examples, the driver 155 and/or battery backup components and the driver housing 150, including the driver housing cover 160, can be configured to contain or withstand exposure to pressures (e.g. hydrostatic pressures) that are greater than or less than approximately 600 psia and the lens can be configured to contain or withstand exposure to pressures (e.g. hydrostatic pressures) that are greater than or less than approximately 300 psia.

Furthermore, the linear light fixture 100 is configured to arrest ignition of gas (e.g. from hot to cold) such that, if any internal electrical ark, spark, ignition, or explosion were to occur within the housing body, the gas, flame, or other element heated as a result of the internal electrical ark, spark, ignition, or explosion would be contained within and would be arrested (e.g. extinguished) within the sealed lighting compartment 320 or the sealed driver housing 150 and would not come into contact with the environment.

Moreover, the linear light fixture 100 is designed such that in the event any gas, flame, or other element heated as a result of the internal electrical ark, spark, ignition, or explosion manages to escape from the enclosure, such gas, flame, or other element would have a temperature insufficient to ignite a gas or other particulate in the environment in which the linear light fixture 100 is employed. For example, with respect to the LEDs 125, the housing body 110, including the lighting compartment 320, the gasket groove 325, and the gasket 131 as well as the lens 130 and the bezel 120 are configured to provide a sealed enclosure around the LEDs 125 that arrests any ignition of gas.

Similarly, the housing body 110, the driver housing 150 and the gasket 151, as well as the driver housing cover 160 and the gasket 152 are configured to provide a sealed enclosure around the driver 155 and/or battery backup components that arrests any ignition of gas. In particular, the front surface 115 of the housing body 110 is extruded or machined to be flat or planar. In addition, the mating surfaces of the driver housing 150 and the bezel 120 are also machined to be flat or planar. Therefore, when mounted together, these flat or planar mating surfaces provide a uniformly tight interface between the front surface 115 of the housing body and the corresponding mating surfaces of the driver housing 150 and the bezel 120 such that any gas, flame, or other ignition source is arrested (e.g. prevented) from leaking out of or exiting the sealed compartments within the driver housing 150 and within the lighting compartment 320 behind the lens 130.

The housing body 110 can be formed as a single housing, for example, using an extrusion process. A single housing is to be understood, therefore, as a component (e.g. a metallic component extruded out of aluminum alloy) that has integral features formed therein. For example, the housing body 110 can be extruded and subsequently machined. Such a process provides a housing body 110 that is a single piece part including integral structural features that are structurally rigid and capable of withstanding the aforementioned temperatures and pressures to which the linear light fixture 100 may be exposed when employed in hazardous or harsh locations. The housing body 110 can include at least one integrally extruded conduit 170 (e.g. wire way) in which at least one wire can be placed. While only one wire 700 is illustrated herein, it is understood that the illustration could represent a plurality of wires, for example, two wires. The integrally extruded conduit 170 can extend from one end of the linear light fixture 100 to another end of the linear light fixture, for example, along the length L1 of the linear light fixture 100. One or more set screws 175 (e.g. M10 set screws) can be threaded into an exposed end of the integrally extruded conduit 170 to seal the exposed end.

The integrally extruded conduit 170 can be accessed from the front surface 115 of the housing body via one or more access wells or pockets (e.g. cavities or apertures) that are machined into the housing body 110. For example, a lighting access pocket 310 can be machined into the lighting compartment 320 to provide access to the integrally extruded conduit 170 at a location proximate to the LEDs 125 and any associated wiring or electrical components.

Similarly, a driver access pocket 305 can be machined into the housing body 110 at a location underneath the driver housing 150 to provide access to the integrally extruded conduit 170 at a location proximate to the driver 155 and/or battery backup components and any associated wiring or electrical components. A lighting pocket cap or plug 311 can be inserted into the lighting access pocket 310, and a driver pocket cap or plug 306 can be inserted into the drive access pocket 305, to provide (e.g. facilitate a holding of wires and a containment of potting compound) a sealed connection around wires that run through the integrally extruded conduit 170, into or out of the lighting access pocket 310 and/or the driver access pocket 305 to electrically connect the LEDs 125 and the driver 155 and/or battery backup components together. As further illustrated, a ground wire 158 can be electrically connected to the housing body 110 and to ground (not shown) to provide a conducting path that directs any unwanted electrical current or charge away from the linear light fixture 100 and into ground, independent of the normal current-carrying path.

Figure 7:
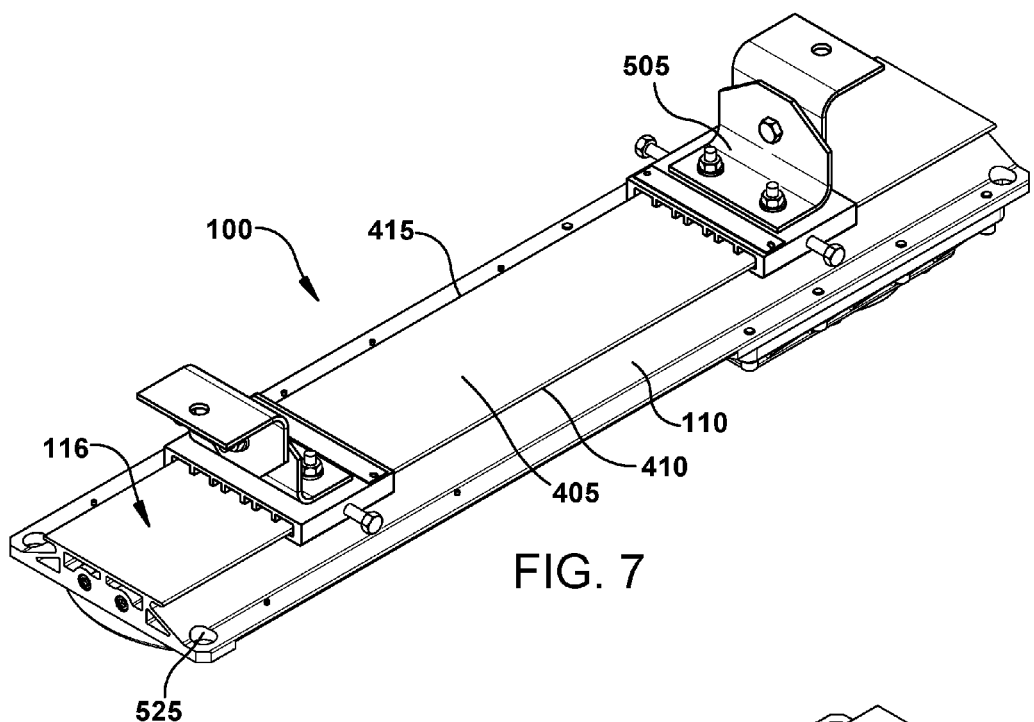
FIG. 7 is an illustration of the linear light fixture shown in FIG. 1 with a first example mounting hardware attached thereto.
Figure 8:
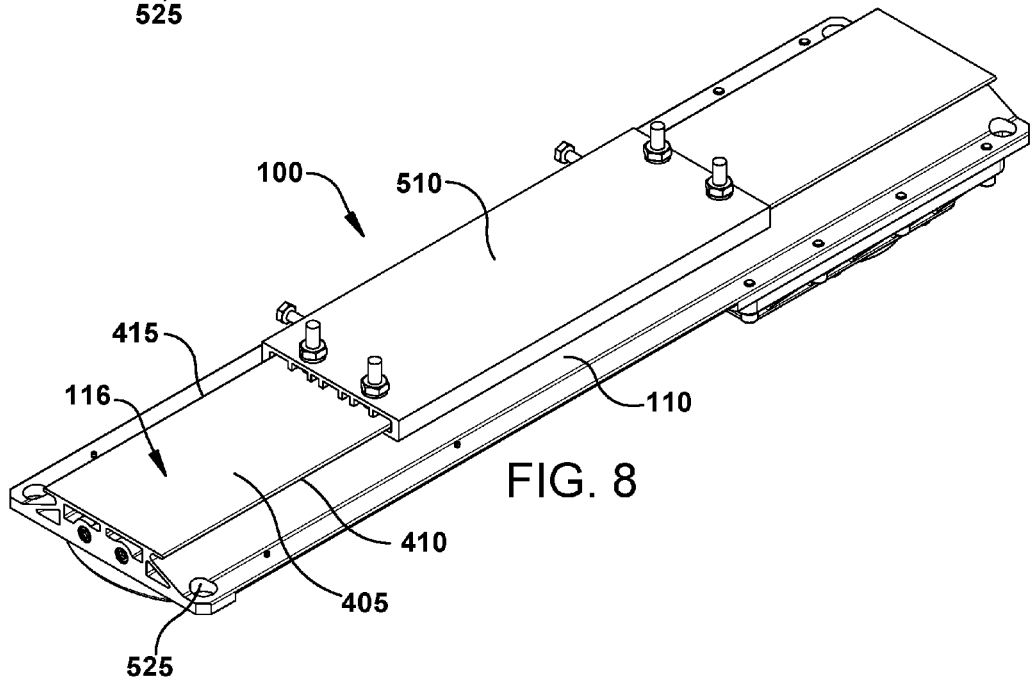
FIG. 8 is an illustration of the linear light fixture shown in FIG. 1 with a second example mounting hardware attached thereto.
Figure 9:
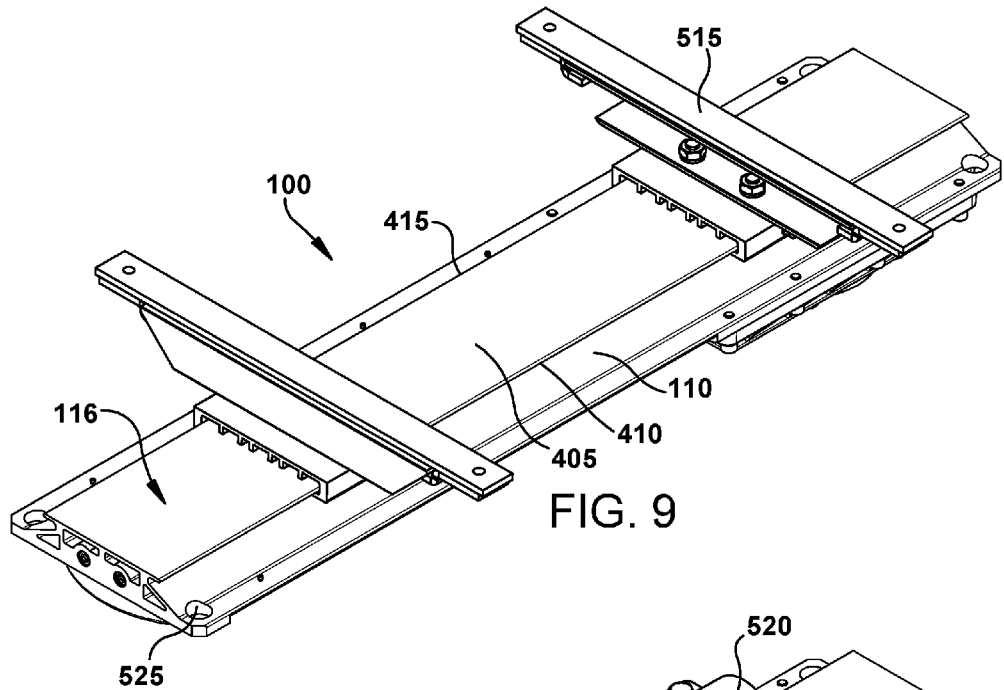
FIG. 9 is an illustration of the linear light fixture shown in FIG. 1 with a third example mounting hardware attached thereto.
Figure 10:
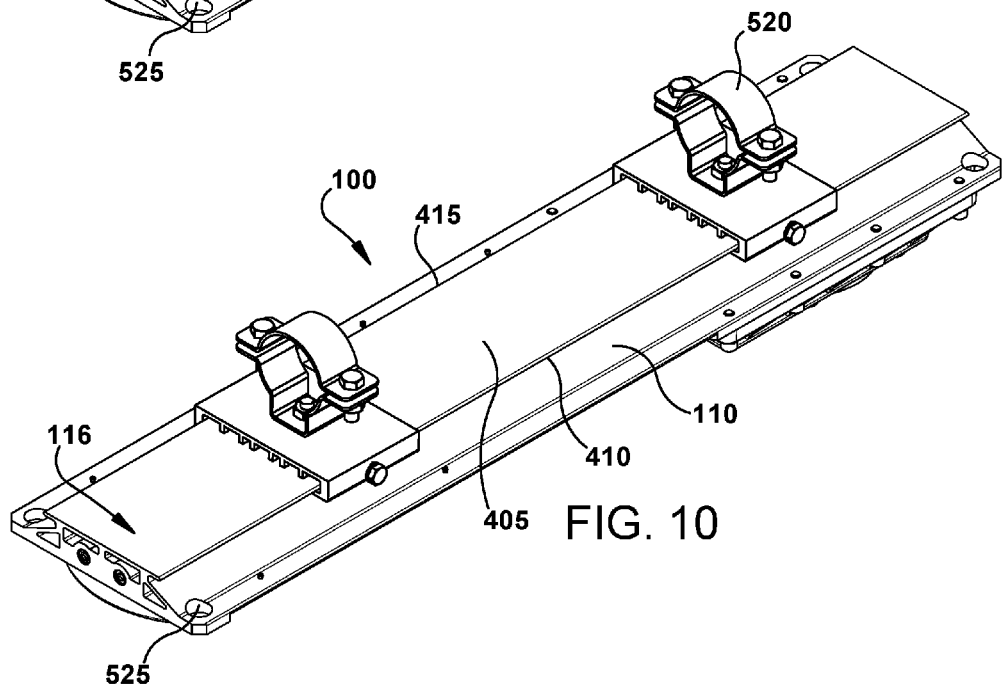
FIG. 10 is an illustration of the linear light fixture shown in FIG. 1 with a fourth example mounting hardware attached thereto.

Turning to FIGS. 7-10, the linear light fixture 100 is shown with various mounting hardware attached thereto. The linear light fixture 100 includes an integral mounting flange 405 formed on a back surface 116 of the linear light fixture 100. The integral mounting flange 405 can be extruded as part of the housing body 110 and can include a first side 410 and a second side 415 configured to provide a structure onto which various mounting hardware can attach. The integral mounting flange 405 can be configured to provide a universal mounting system that accepts a wide range of bracket configurations such that the linear light fixture 100 can interchangeably connect to a variety of mounting hardware, including the specific mounting hardware disclosed herein as well as additional mounting hardware not disclosed herein. For example, as shown in FIG. 7, a swivel mount 505 can be attached to the integral mounting flange 405. As shown in FIG. 8, a back mount 510 can be attached to the integral mounting flange 405. A bracket mount 515 can be attached to the integral mounting flange 405, as shown in FIG. 9, and a pole mount 520 can be attached to the integral mounting flange 405, as shown in FIG. 10.

In addition, an integral eyelet 525 can be machined into the housing body 110 to serve as a secondary retention point or redundant safety connection. For example, one end of one or more safety cables or lanyards (not shown) can be attached to or through the integral eyelet 525 and another end of the cables can be secured to a structure onto which the linear light fixture 100 and the mounting hardware are attached, such as a wall or ceiling. In the event the mounting hardware comes loose (e.g. due to vibration, shock, or contact) or breaks and fails to securely attach the linear light fixture 100 to the structure, the cable will hold the linear light fixture 100 in proximity to the structure at a length of the cable. Thus, the linear light fixture 100 will not fall onto a person or object causing injury to the person or object and or damage to the linear light fixture 100. Multiple integral eyelets 525 can be machined into the housing body 110, for example at each corner of the housing body 110, to provide additional redundant safety connections.

Figure 11:
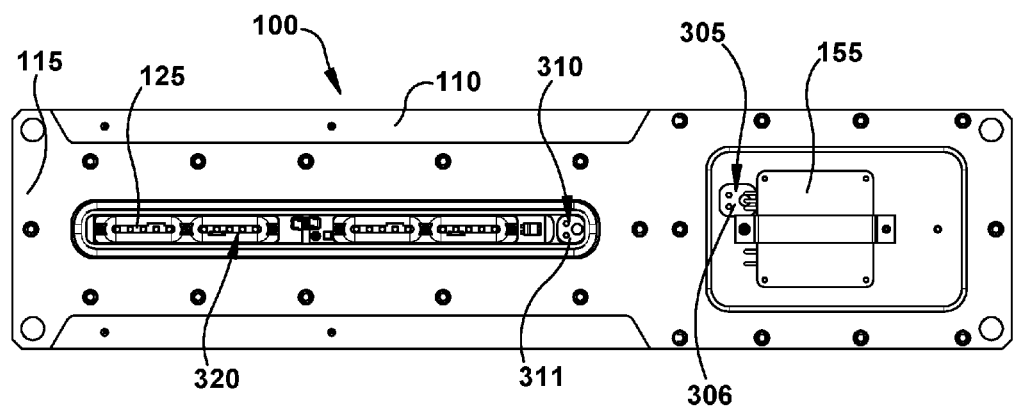
FIG. 11 is an illustration of a top view of the linear light fixture shown in FIG. 1 with various components removed for clarity.
Figure 12:
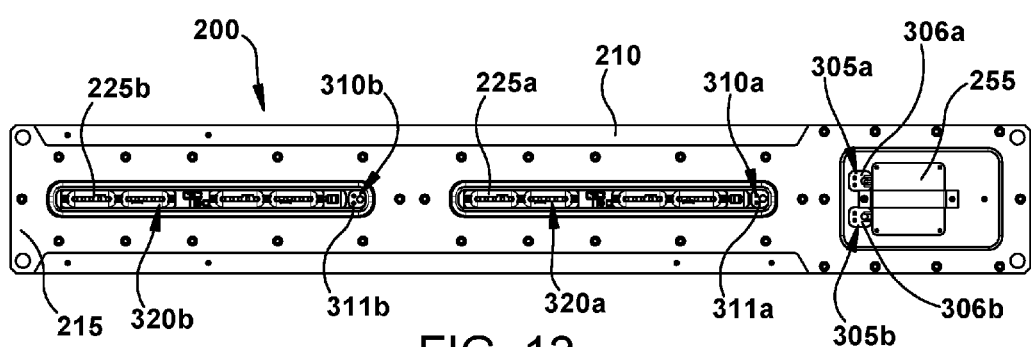
FIG. 12 is an illustration of a top view of the linear light fixture shown in FIG. 2 with various components removed for clarity.

Turning to FIGS. 11 and 12, the first example linear light fixture 100 and the second example linear light fixture 200 are shown, respectively, with their respective driver housings 150, 250 and their respective bezels 120, 220a, 220b and lens 130, 230 removed for clarity. As shown in FIG. 11, with respect to the first example linear light fixture 100, the driver access pocket 305 is located in proximity to the driver 155 and/or battery backup components to provide an opening in the front surface 115 of the housing body 110 to permit access to the integrally extruded conduit 170.

Figure 28:
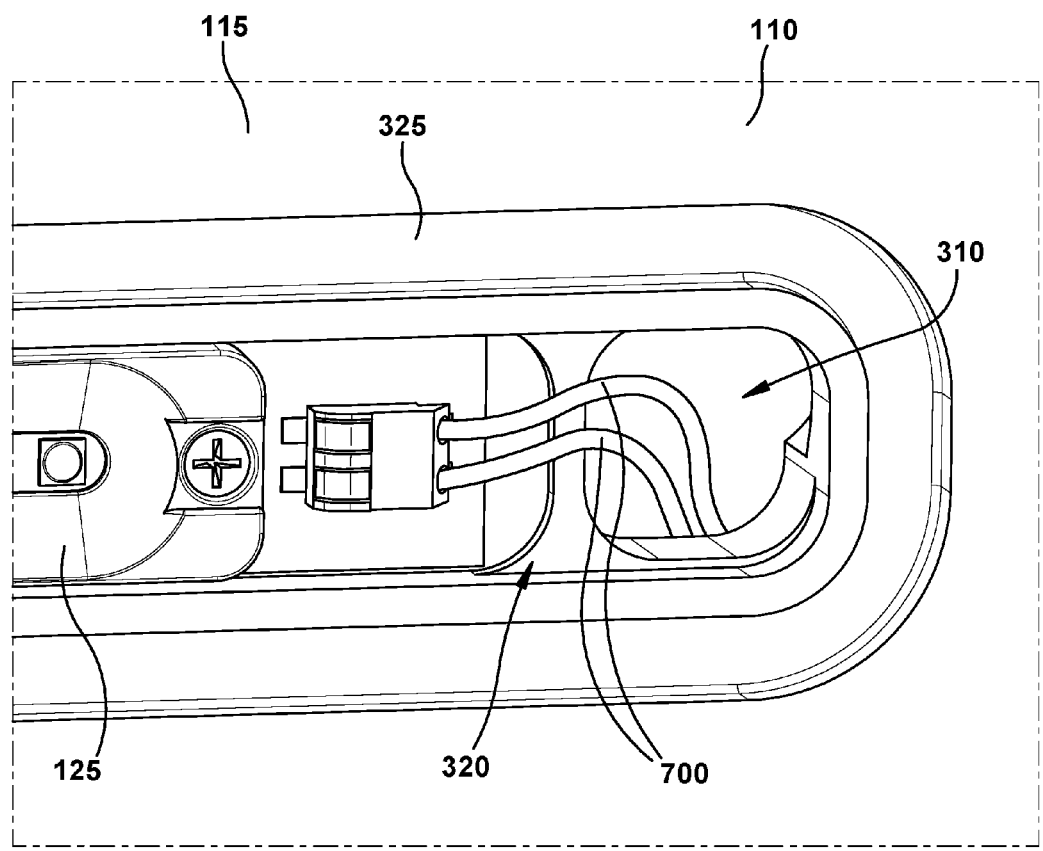
FIG. 28 is an illustration of a linear light fixture in accordance with embodiments described herein, including various example wiring configurations.

Likewise, the lighting access pocket 310, formed in the lighting compartment 320, is located in proximity to the LEDs 125 to provide another opening in the front surface 115 of the housing body 110 to permit access to the integrally extruded conduit 170. In each of the driver access pocket 305 and the lighting access pocket 310, the driver pocket plug 306 and the lighting pocket plug 311 are optionally and respectively placed. With respect to the first example linear light fixture 100, the driver 155 and/or battery backup components is electrically connected to the LEDs 125 via at least one wire (e.g. wire 700 shown in FIG. 28) that runs through the integrally extruded conduit 170 between the driver 155 and/or battery backup components, and the LEDs 125. The wire connects to terminals of the driver 155 and/or battery backup components at the driver access pocket 305 and connects to the LEDs 125 at the lighting access pocket 310.

Figure 15:
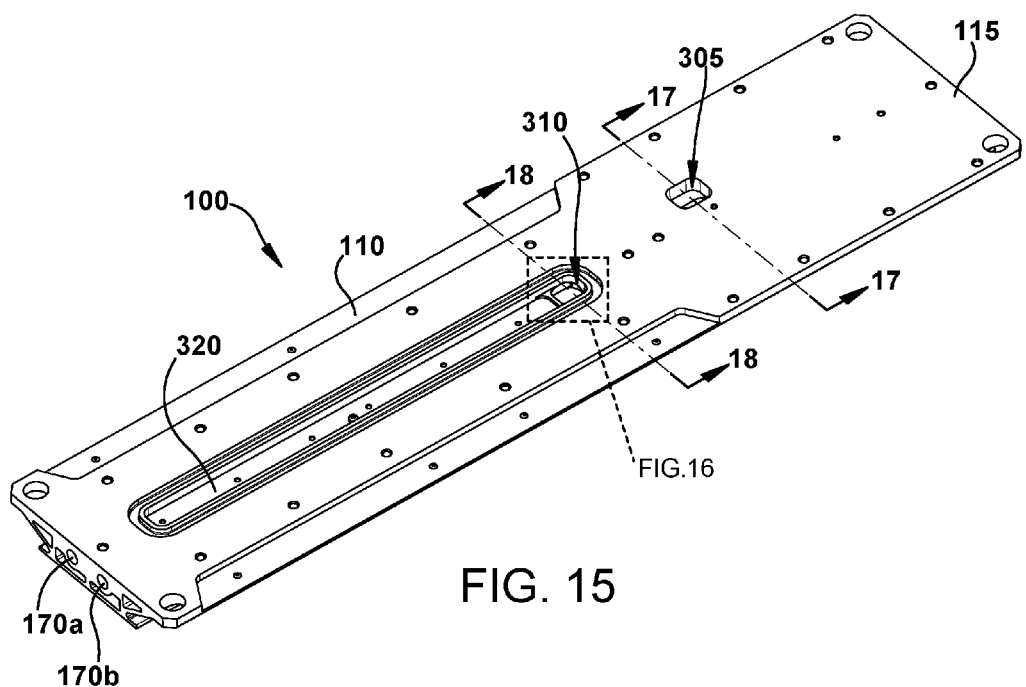
FIG. 15 is an illustration of a perspective view of the linear light fixture shown in FIG. 1 with various components removed for clarity.
Figure 17:
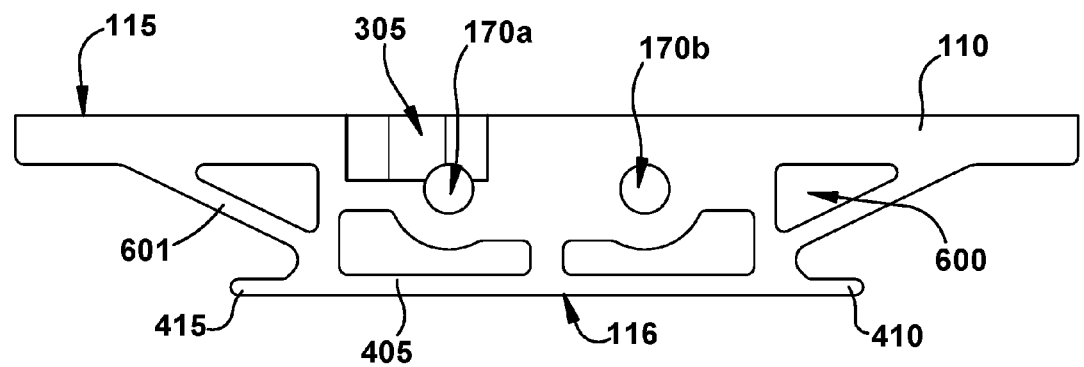
FIG. 17 is an illustration of a cross-sectional view of the linear light fixture shown in FIG. 15 taken along line 17-17.
Figure 18:
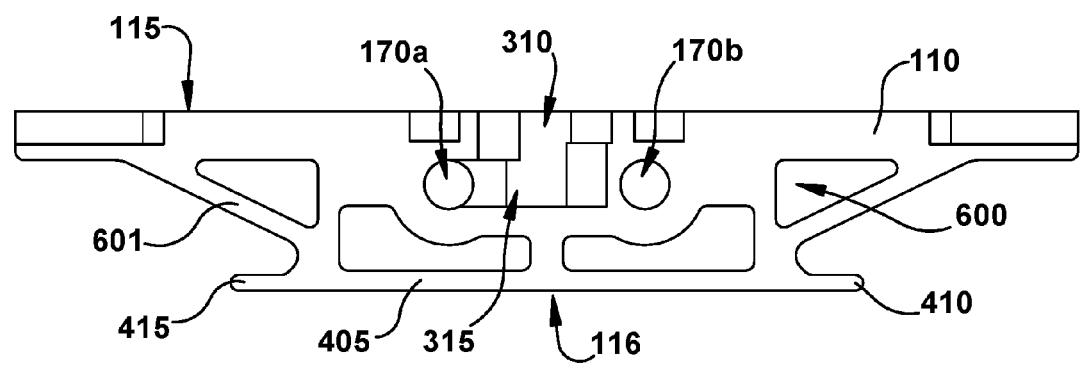
FIG. 18 is an illustration of a cross-sectional view of the linear light fixture shown in FIG. 15 taken along line 18-18.

As shown in FIG. 12, with respect to the second example linear light fixture 200, a first driver access pocket 305a and a second driver access pocket 305b are located in proximity to a driver 255 and/or battery backup components to provide two openings in a front surface 215 of the longer housing body 210 to respectively permit access to a first integrally extruded conduit 170a and a second integrally extruded conduit 170b (shown in FIGS. 15, 17, and 18). Likewise, a first lighting access pocket 310a, formed in a first lighting compartment 320a, is located in proximity to first LEDs 225a to provide another opening in the front surface 215 of the longer housing body 210 to permit access to the first integrally extruded conduit 170a.

A second lighting access pocket 310b, formed in a second lighting compartment 320b, is located in proximity to second LEDs 225b to provide yet another opening in the front surface 215 of the longer housing body 210 to permit access to the second integrally extruded conduit 170b. In each of the first and second driver access pockets 305a, 305b and the first and second lighting access pockets 310a, 310b, first and second driver pocket plugs 306a, 306b and first and second lighting pocket plugs 311a, 311b are respectively placed. With respect to the second example linear light fixture 200, the driver 255 and/or battery backup components is electrically connected to the first and second LEDs 225a, 225b via wires (e.g. wires 701, 702 shown in FIG. 29) that run through the first and second integrally extruded conduits 170a, 170b between the driver 255 and/or battery backup components and the first and second LEDs 225a, 225b. The wires connect to terminals of the driver 255 and/or battery backup components at the first and second driver access pockets 305a, 305b and connect to the first and second LEDs 225a, 225b at the first and second lighting access pockets 310a, 310b.

Figure 13:
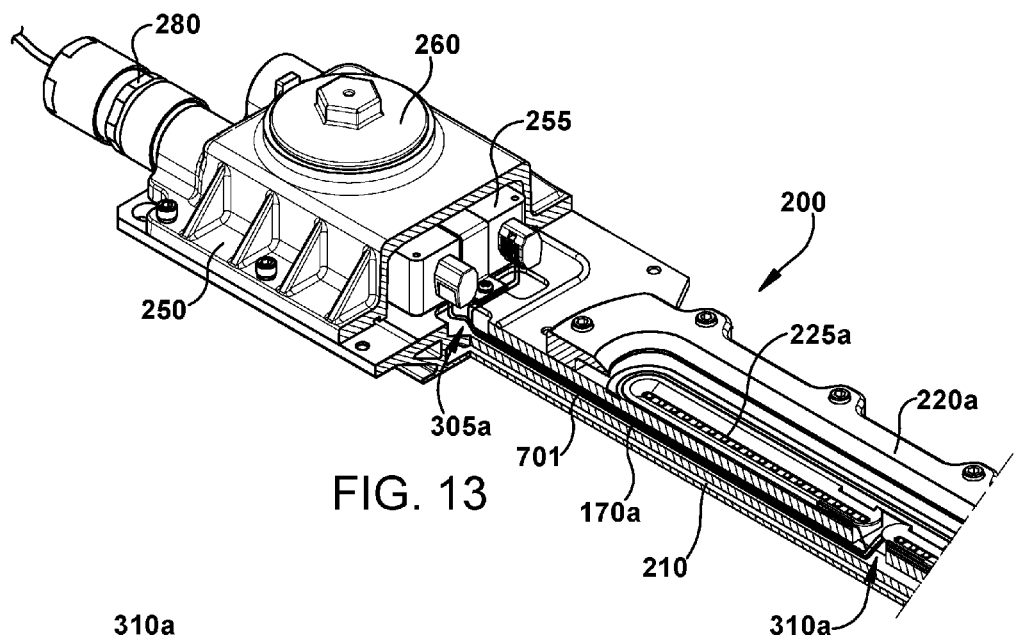
FIG. 13 is an illustration of a first example cutaway perspective view of the linear light fixture shown in FIG. 2.
Figure 14:
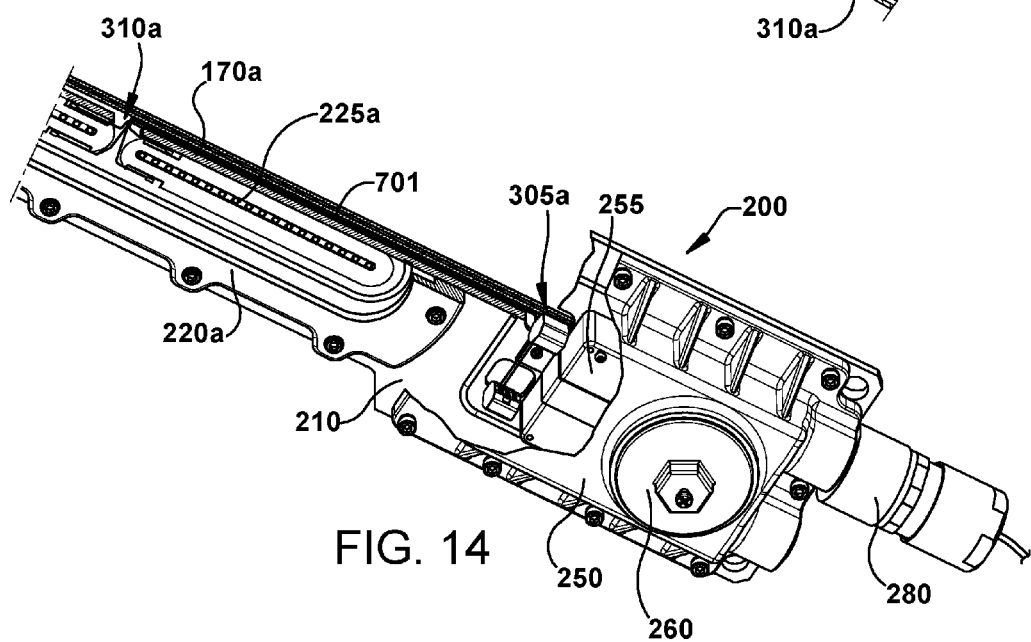
FIG. 14 is an illustration of a second example cutaway perspective view of the linear light fixture shown in FIG. 2.

A cutaway perspective view of the second example linear light fixture 200, with an alternate wiring configuration, is shown in FIGS. 13 and 14. As illustrated, wires 701 are connected to the driver 255 and/or battery backup components and the first LEDs 225 and run through the first integrally extruded conduit 170a from the first driver access pocket 305a to the first lighting access pocket 310a. As shown, the integrally extruded conduit 170 completely encloses or encapsulates the wires 701 and is formed as an integral wire way or path within the longer housing body 210. In addition, a power supply (e.g. cable gland or fitting) 280 is shown attached (e.g. threaded) to the driver housing 250 and electrically connect to the driver to provide electrical power (e.g. alternating current) to the driver 255.

Figure 16:
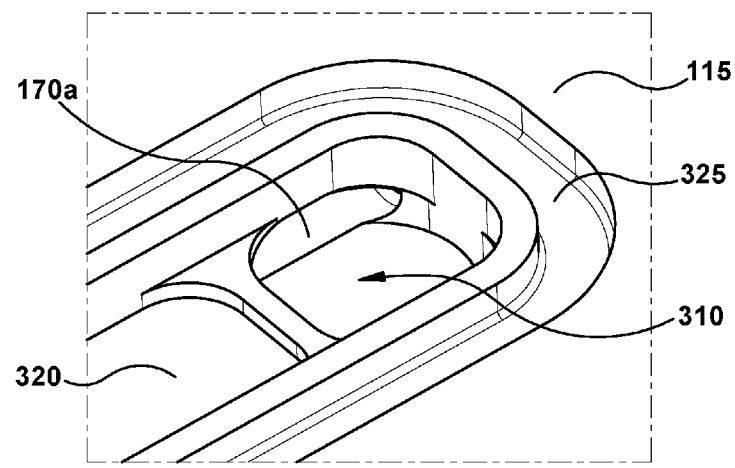
FIG. 16 is an illustration of feature 16 of the linear light fixture shown in FIG. 15.

Turning to FIG. 15, the first example linear light fixture 100 is shown with the lighting compartment 320 formed in the front surface 115 of the housing body 110. The first and second integrally extruded conduits 170a, 170b are shown running the length of the housing body 110 from one end to another. As shown by reference numeral 16, a close-up view of the lighting access pocket 310 is shown in FIG. 16. As noted, the lighting access pocket 310 is formed in the lighting compartment 320 internal to the gasket groove 325 and provides access from the front surface 115 of the housing body 110 to the first integrally extruded conduit 170a.

FIG. 17 shows a cross-sectional view taken along line 17-17, including the driver access pocket 305, and FIG. 18 shows a cross-sectional view taken along line 18-18, including the lighting access pocket 310. As shown in FIG. 17, the driver access pocket 305 is formed in the housing body 110 to provide access from the front surface 115 of the housing body 110 to the first integrally extruded conduit 170a. The second integrally extruded conduit 170b remains closed; however in other example embodiments, for example, where more LEDs are included and additional access to the driver or the LEDs is needed, another driver access pocket can be included provide access to the second integrally extruded conduit 170b.

The integral mounting flange 405 including the first side 410 and the second side 415 is also provided on the back surface 116 of the housing body 110. In addition, voids, hollows, or spaces 600 can be formed in the housing body 110 during the extrusion process or machined subsequent to the extrusion process to remove material and reduce a weight of the light fixture or to provide reinforced structural support members 601 on the housing body 110. With respect to the lighting access pocket 310 in FIG. 18, it can be seen that the in order to provide access from the front surface 115 of the housing body 110 to the first integrally extruded conduit 170a, the lighting access pocket 310 can include a side step portion 315 (e.g. machined using a side cutter or other tool) that extends horizontally through the housing body 110.

Figure 19:
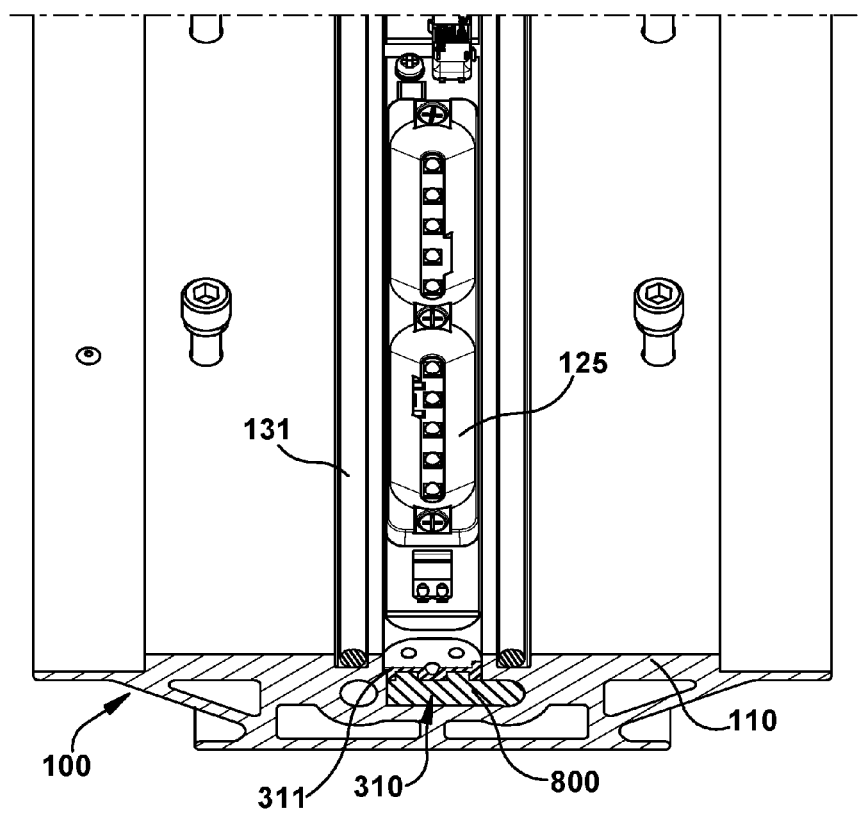
FIG. 19 is an illustration of a cross-sectional perspective view of a linear light fixture in accordance with embodiments described herein.
Figure 20:
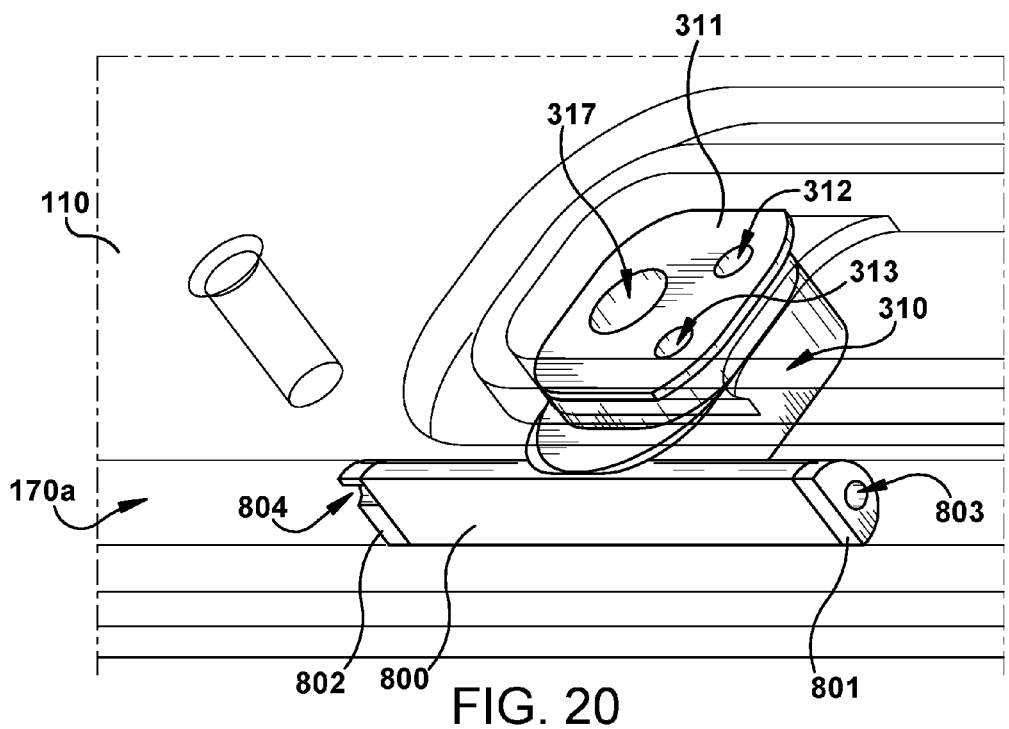
FIG. 20 is an illustration of a perspective view of a linear light fixture in accordance with embodiments described herein.

Turning to FIGS. 19 and 20, a cutaway perspective view of the lighting access pocket 310 is provided, showing a potting compound 800 (e.g. an epoxy or sealant) in the lighting access pocket 310. The potting compound 800 can isolate or seal the first integrally extruded conduit 170a at the opening formed in the housing body 110 by the lighting access pocket 310. Further, the lighting pocket plug 311 extends across the opening of the lighting access pocket 310 and includes a first and second wire aperture 312, 313 through which wires (e.g. a positive connection and a neutral connection) can be fed or inserted and held or separated from each other by the lighting pocket plug 311. In addition, the lighting pocket plug 311 can include a potting aperture 317 into which a tip or nozzle of a potting tool can be inserted. The potting aperture 317 is configured to form a mating connection around the tip or nozzle of the potting tool such that the potting compound 800 can be injected into the lighting access pocket 310 through the potting aperture 317 in a sealed or pressurized manner.

As shown in FIG. 20, a first and second wire grommet 801, 802 can be placed within the first integrally extruded conduit 170a at a distance from each other to control a flow of the potting compound 800 within the first integrally extruded conduit 170a when the potting compound 800 is injected into the lighting access pocket 310 through the potting aperture 317 formed in the lighting pocket plug 311. Each of the first and second wire grommets 801, 802 can include a corresponding wire aperture 803, 804, respectively through which a wire can extend. The lighting pocket plug 311 as well as the first and second wire grommets 801, 802 can be formed of a foam elastomer or other resilient material by which each can be press-fitted into a corresponding opening of lighting access pocket 310 or the first integrally extruded conduit 170a. It is to be understood that, while the potting compound 800 and method of injecting the potting compound 800 is described with respect to the lighting access pocket 310, other holes, apertures, and conduits formed within the housing body or other element of the linear lighting fixture can also benefit from the same or similar potting technique to seal and/or isolate the hole, aperture, or conduit from exposing or exposure to various environments. For example, gas compartment isolation prevents explosion pressure piling and reduces pressure level.

Figure 21:
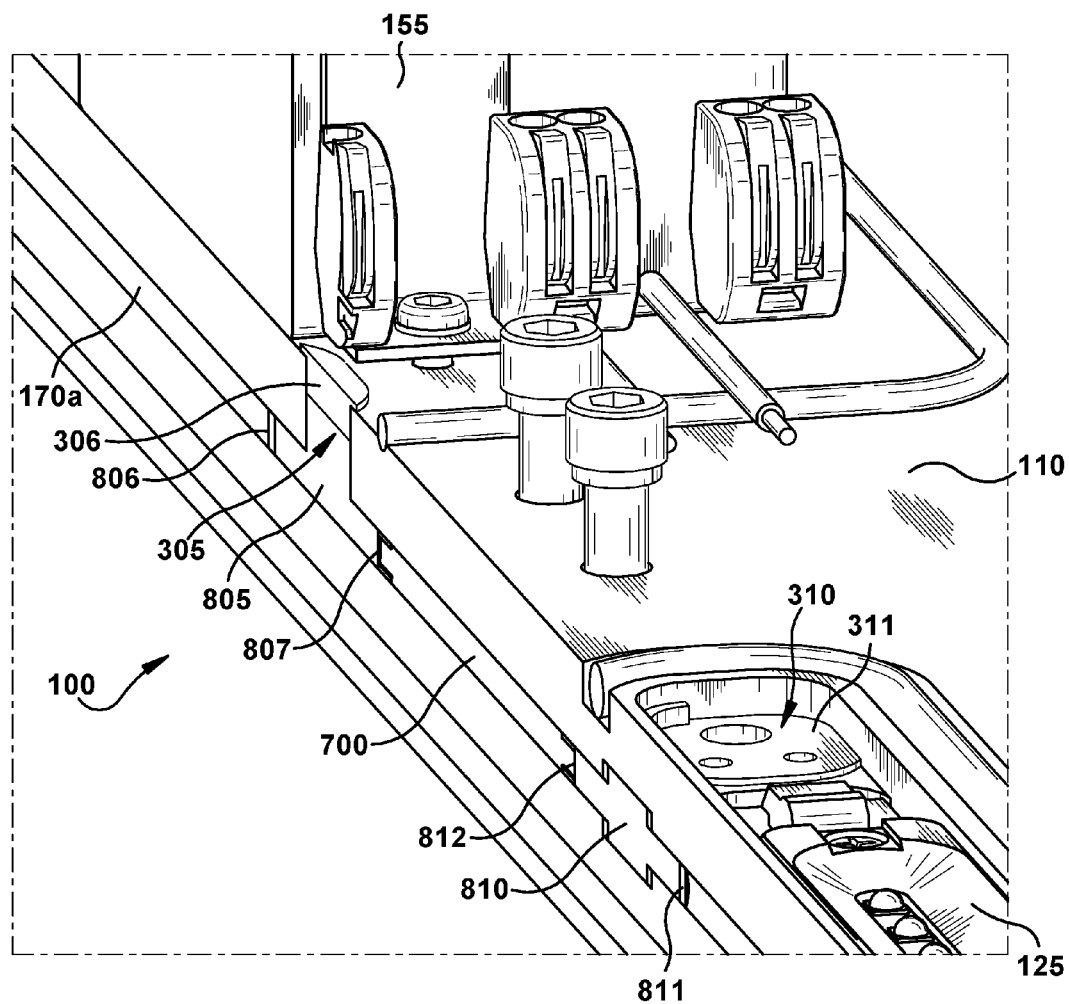
FIG. 21 is an illustration of a cross-sectional perspective view of a linear light fixture in accordance with embodiments described herein.

FIG. 21 illustrates a first potting 805 provided in the driver access pocket 305 and the first integrally extruded conduit 170a between the driver pocket plug 306 and first and second first potting grommets 806, 807. A second potting 810 is provided in the lighting access pocket 310 and the first integrally extruded conduit 170a between the lighting pocket plug 311 and first and second potting grommets 811, 812. At least one wire 700 is sealed by the first and second pottings 805, 810 and extends in the first integrally extruded conduit 170a between the driver 155 and/or battery backup components and the LEDs 125. The wire 700 is therefore isolated and sealed within the housing body 110 as well as within the driver housing and behind the lens and bezel such that the linear light fixture 100 can be employed in harsh and hazardous locations.

Figure 22:
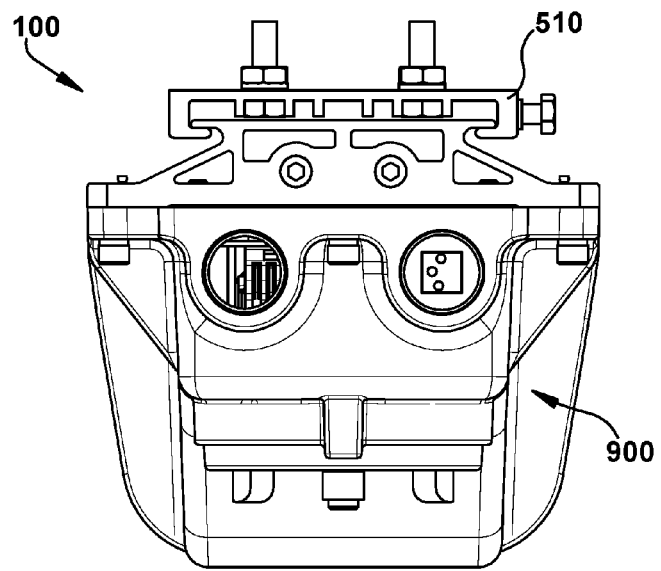
FIG. 22 is an illustration of a linear light fixture in accordance with embodiments described herein, including various example mounting hardware and an example battery backup unit attached thereto.
Figure 23:
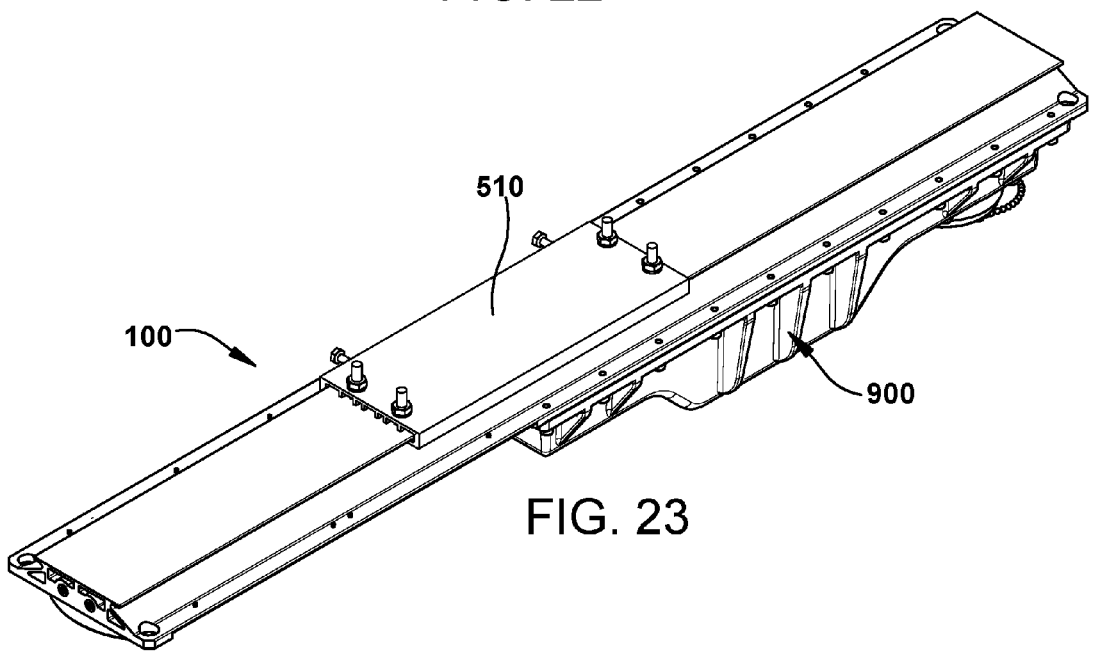
FIG. 23 is an illustration of a linear light fixture in accordance with embodiments described herein, including various example mounting hardware and an example battery backup unit attached thereto.
Figure 24:
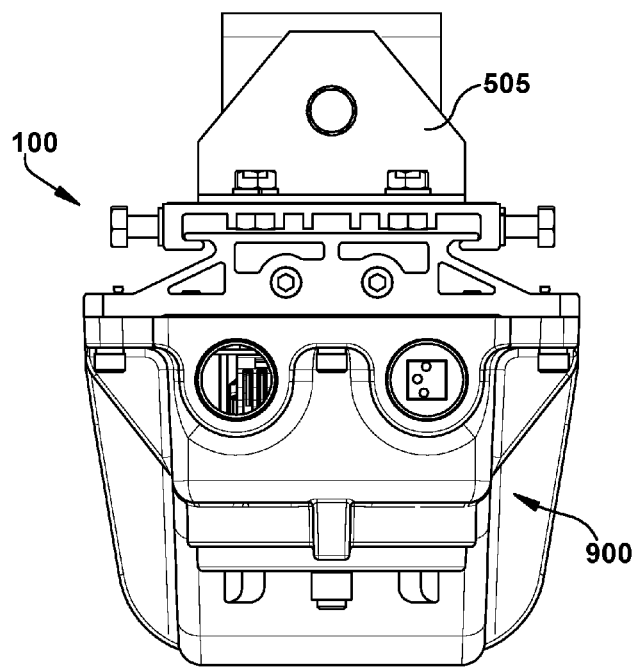
FIG. 24 is an illustration of a linear light fixture in accordance with embodiments described herein, including various example mounting hardware and an example battery backup unit attached thereto.
Figure 25:
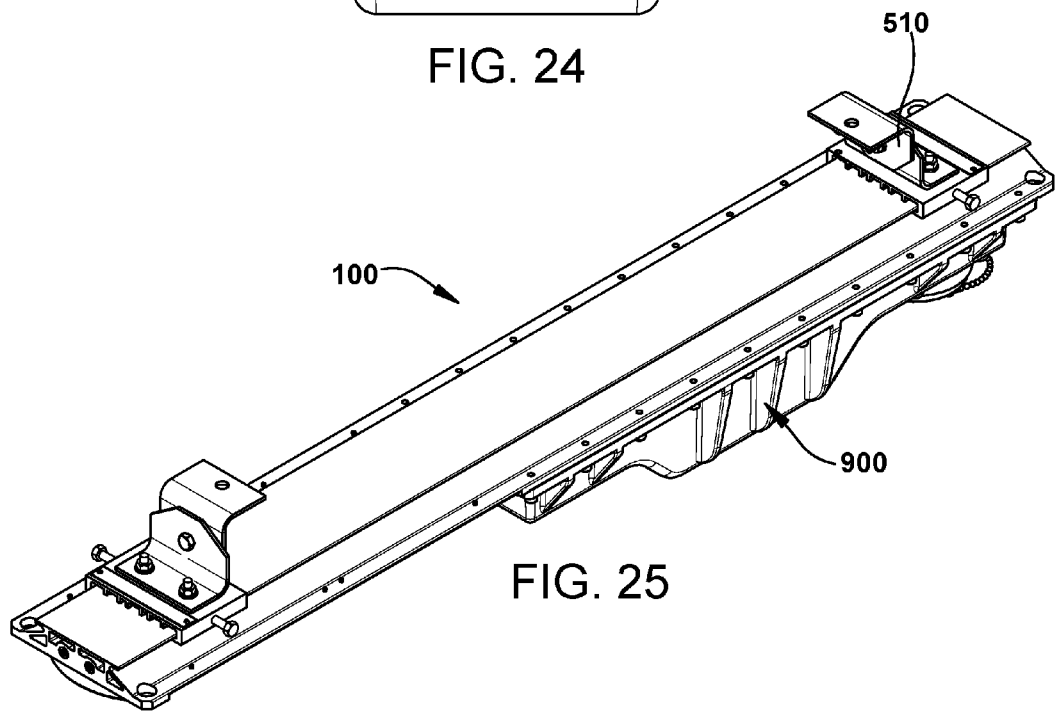
FIG. 25 is an illustration of a linear light fixture in accordance with embodiments described herein, including various example mounting hardware and an example battery backup unit attached thereto.

While a battery backup has generally been discussed above, FIGS. 22-27 illustrate the first example linear light fixture 100 with a battery backup unit 900 attached thereto. The battery backup unit 900 is configured to provide auxiliary power to the driver to power the LEDs in the event main power to the linear light fixture 100 is disrupted (e.g. during an electrical outage). In FIGS. 22 and 23, the back mount 510 is attached to the linear light fixture 100 to secure the light fixture, including the battery backup unit 900, to a structure, such as a wall or a ceiling. In FIGS. 24 and 25, the swivel mount 505 is attached to the linear light fixture 100 to secure the light fixture, including the battery backup unit 900, to a structure, such as a wall or a ceiling. As shown in FIGS. 26 and 27, the battery backup unit 900 can include a battery backup housing 905 that encloses a battery and the driver (neither of which is shown, but both of which are understood to be located inside the battery backup housing 905).

Figure 29:
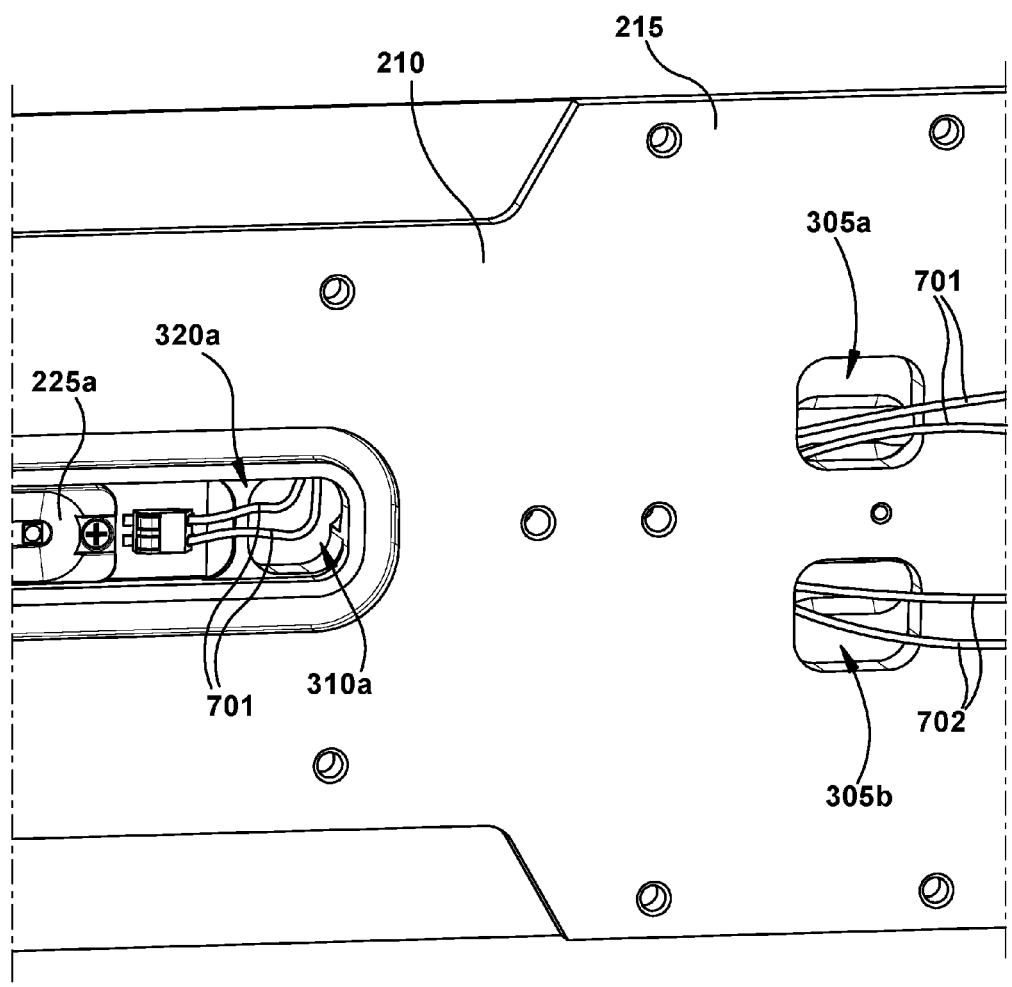
FIG. 29 is an illustration of a linear light fixture in accordance with embodiments described herein, including various example wiring configurations.

FIGS. 28-31 illustrate additional wiring configurations of the example linear light fixtures disclosed herein. With respect to FIG. 28, the lighting access pocket 310 is machined in the lighting compartment 320 internal to the gasket groove 325. The lighting access pocket 310 provides access from the front surface 115 of the housing body 110 to the integrally extruded conduit such that at least one wire 700 can connect from the driver (not shown) to the LEDs 125. FIG. 29 shows the first and second driver access pockets 305a, 305b machined in the front surface 215 of the longer housing body 210 with first and second wires 701, 702 extending therefrom. The first wire 701 runs through the longer housing body 210 (within the integrally extruded conduit) and emerges in the first lighting compartment 320a from the first lighting access pocket 310a to connect to the first LEDs 225a.

Figure 30:
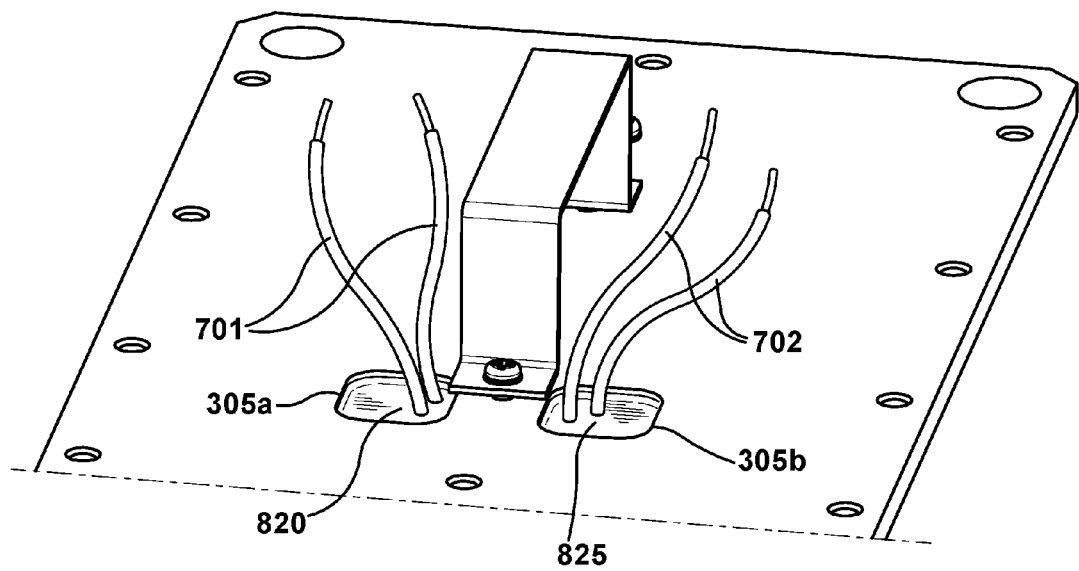
FIG. 30 is an illustration of a linear light fixture in accordance with embodiments described herein, including various example wiring configurations.
Figure 31:
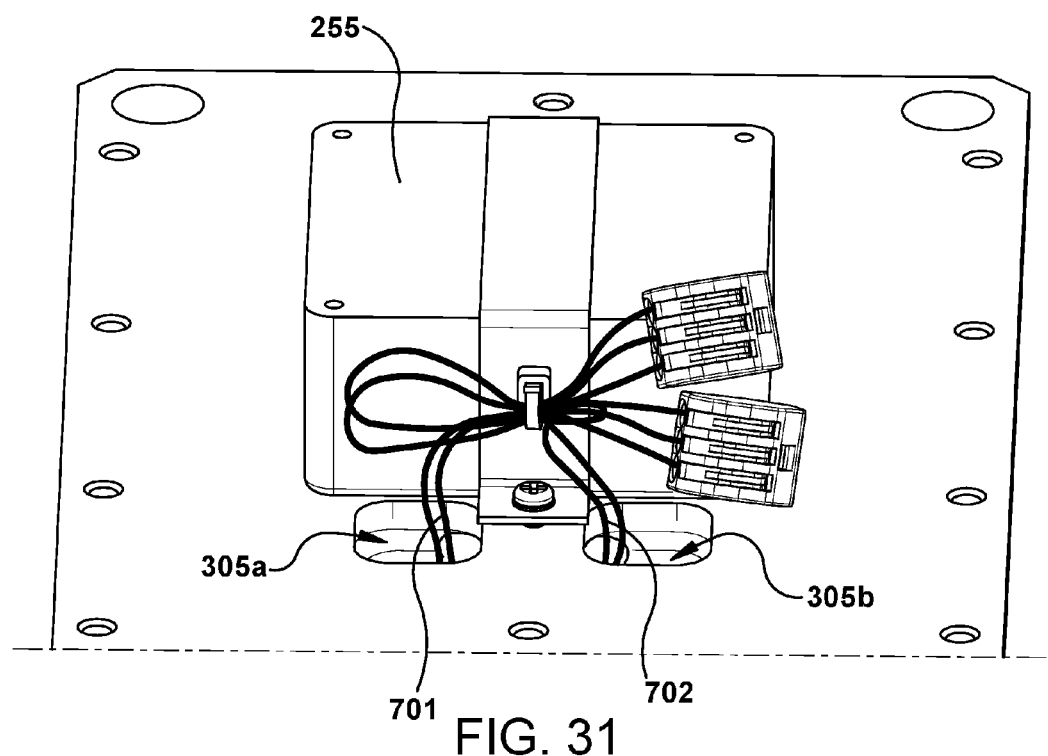
FIG. 31 is an illustration of a linear light fixture in accordance with embodiments described herein, including various example wiring configurations.

FIG. 30 shows the first and second driver access pockets 305a, 305b with corresponding potting 820, 825 injected into the respective openings to seal around the first and second wires 701, 702. As shown, driver or lighting pocket caps or plugs are optional and are not inserted into the respective access pockets shown in FIG. 30. Further, FIG. 31 shows the first and second wires 701, 702 connected to the driver 255. In FIG. 31, the potting has not been injected into the corresponding first and second driver access pockets 305a, 305b.

It will be apparent to those skilled in the art that various modifications and variations can be made without departing from the spirit and scope of the claimed invention.

What is claimed is:

1. A linear light fixture comprising:
a housing body,
at least one light emitting diode attached to the housing body,
at least one of a power convertor and a power storage device attached to the housing body and configured to supply electric power to the at least one light emitting diode,
a conduit within the housing body that extends along the length of the housing body from a first end of the linear light fixture to a second end of the linear light fixture, and
wherein one of at least one wire is arranged in the conduit electrically connecting said at least one of the power convertor and power storage device to said at least one light emitting diode, a first end of the one of at least one wire extending out of the conduit via a driver access pocket to connect to said at least one of the power converter and power storage device, a second end of the one of at least one wire extending out of the conduit via a lighting access pocket to connect to said at least one light emitting diode.

2. The linear light fixture of claim 1, further comprising a lens enclosing the at least one light emitting diode and the lighting access pocket, and a driver housing enclosing the at least one of the power convertor and power storage device and the driver access pocket.

3. The linear light fixture of claim 1, further comprising potting arranged in at least one of the driver access pocket and the lighting access pocket.

4. The linear light fixture of claim 3, further comprising a grommet arranged in the conduit and configured to control a flow of the potting compound.

5. The linear light fixture of claim 1, wherein the conduit facilitates an explosion-proof enclosure.

6. The linear light fixture of claim 1, wherein another one of the at least one wire enters the light fixture at a first end and exits the light fixture at a second end opposite the first end.

7. The linear light fixture of claim 1, wherein another one of the at least one wire is from an internal power source.

8. The linear light fixture of claim 1, wherein another one of the at least one wire is from an external power source.

9. The linear light fixture of claim 1, wherein the housing body includes at least one aperture that provides access to the at least one wire extending through the conduit.

10. A linear light fixture comprising:
a housing body; and
a conduit formed within the housing body and extending along a length of the housing body, within which one of at least one wire extends to connect at least one of a power convertor and a power storage device to at least one light emitting diode; wherein
a first end of the one of at least one wire extends out of the conduit via a driver access pocket to connect to said at least one of the power converter and power storage device, a second end of the one of at least one wire extends out of the conduit via a lighting access pocket to connect to said at least one light emitting diode.

11. The linear light fixture of claim 10, wherein the housing body includes a recessed lighting compartment within which the at least one light emitting diode is located.

12. The linear light fixture of claim 10, wherein the conduit runs the entire length of the extruded housing body.

13. The linear light fixture of claim 12, further including potting compound within the conduit, the potting compound being configured to seal at least a portion of the conduit.

14. The linear light fixture of claim 10, wherein the conduit is sealed to create an explosion-proof enclosure.

15. The linear light fixture of claim 10, wherein another one of the at least one wire enters the light fixture at a first end and exits the light fixture at a second end opposite the first end.

16. The linear light fixture of claim 10, wherein the extruded housing body further comprises at least one eyelet.

17. The linear light fixture of claim 16, wherein the light fixture is secured to a structure at least in part via a cable or lanyard attached to or through the at least one eyelet at a first end and attached to the structure at a second end, and wherein the structure is located in a direction orthogonal to the length of the extruded housing body.

18. A method of manufacturing the light fixture of claim 10 comprising:

forming the housing body as a single element by using an extrusion process; and forming integrally extruded features within the housing body, wherein at least one of the integrally extruded features is the conduit in which the at least one wire can be placed, the conduit extending along the length of the light fixture.

* * * * *